(12) United States Patent
Naser et al.

(10) Patent No.: US 12,363,346 B2
(45) Date of Patent: Jul. 15, 2025

(54) HIGH PRECISION 4×4 DST7 AND DCT8 TRANSFORM MATRICES

(71) Applicant: InterDigital CE Patent Holdings, SAS, Paris (FR)

(72) Inventors: Karam Naser, Mouaze (FR); Fabrice Le Leannec, Betton (FR); Philippe De Lagrange, Betton (FR); Philippe Bordes, Laille (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 92 days.

(21) Appl. No.: 18/285,610

(22) PCT Filed: Mar. 29, 2022

(86) PCT No.: PCT/EP2022/058316
§ 371 (c)(1),
(2) Date: Oct. 4, 2023

(87) PCT Pub. No.: WO2022/214363
PCT Pub. Date: Oct. 13, 2022

(65) Prior Publication Data
US 2024/0187649 A1 Jun. 6, 2024

(30) Foreign Application Priority Data
Apr. 8, 2021 (EP) .................................. 21305453

(51) Int. Cl.
*H04N 19/625* (2014.01)
*H04N 19/172* (2014.01)
*H04N 19/176* (2014.01)
*H04N 19/18* (2014.01)

(52) U.S. Cl.
CPC ......... *H04N 19/625* (2014.11); *H04N 19/172* (2014.11); *H04N 19/176* (2014.11); *H04N 19/18* (2014.11)

(58) Field of Classification Search
CPC ........................... H04N 19/625; H04N 19/172
USPC ...................................................... 375/240.2
See application file for complete search history.

(56) References Cited

PUBLICATIONS

Zhang et al; "Fast Adaptive Multiple Transform for Versatile Video Coding", 2019 Data Compression Conference (DCC), IEEE, Mar. 26, 2019, pp. 63-72 (Year: 2019).*

(Continued)

*Primary Examiner* — Amir Shahnami
(74) *Attorney, Agent, or Firm* — Condo Roccia Koptiw LLP

(57) ABSTRACT

A method for reconstructing a block of a picture comprising: applying an inverse transform to a block of transform coefficients using a first matrix of integer coefficients representative of the inverse transform, wherein the first matrix of integer coefficients is the inverse of a second matrix of integer coefficients representative of a transform inverted to obtain the inverse transform, the second matrix of integer coefficients being derived from a third matrix of integer coefficients, the absolute values of the integer coefficients of the third matrix taking their values in a set of four different values, the derivation comprising a modification of one value of the set to ensure that a sum of two values of the set equals a third value of the set.

14 Claims, 6 Drawing Sheets

(56) References Cited

PUBLICATIONS

"Information Technology—Generic Coding of Moving Pictures and Associated Audio", International Organization for Standardization, ISO/IEC JTC1/SC29/WG11, N0702rev, Recommendation H.262, ISO/IEC 13818-2, Mar. 25, 1994, 212 pages.

Browne et al., "High bit depth coding", Joint Video Experts Team (JVET) of ITU-T SG 16 WP 3 and ISO/IEC JTC 1/SC 29WG 11, Document: JVET-R0351, 18th Meeting: by teleconference, Apr. 15, 2020, 23 pages.

"Information technology—Coded representation of immersive media—Part 3: Versatile video coding, Amendment 1: Operation range extensions", International Organization for Standardization (ISO) and International Electrotechnical Commission (IEC), ISO/IEC JTC 1/SC 29/WG 5 N 52, Text of ISO/IEC 23090-3:2021/CDAM 1, Apr. 28, 2021, 24 pages.

Zhao et al., "CE6: Fast DST-7/DCT-8 with dual implementation support (Test 6.2.3)", Joint Video Experts Team (JVET) of ITU-T SG 16 WP 3 and ISO/IEC JTC 1/SC 29/WG 11, Document: JVET-M0497, 13th Meeting: Marrakech, Morocco, Jan. 9, 2019, 11 pages.

Zhang et al., "Fast Adaptive Multiple Transform for Versatile Video Coding", Institute of Electrical and Electronics Engineers (IEEE), 2019 Data Compression Conference (DCC), Snowbird, Utah, USA, Mar. 26, 2019, 10 pages.

Sharman et al., "AHG 5 and 18: Internal Precision for High Bit Depths", Joint Collaborative Team on Video Coding (JCT-VC) of ITU-T SG 16 WP 3 and ISO/IEC JTC 1/SC 29/WG 11, Document: JCTVC-N0188, 14th Meeting: Vienna, Austria, Jul. 25, 2013, 24 pages.

\* cited by examiner

HIGH PRECISION 4×4 DST7 AND DCT8 TRANSFORM MATRICES

CROSS REFERENCE TO RELATED APPLICATIONS

This application is a U.S. National Stage Application under 35 U.S.C. § 371 of International Patent Application No. PCT/EP2022/058316, filed Mar. 29, 2022, which is incorporated herein by reference in its entirety.

This application claims priority to European Application No. 21305453.9, filed Apr. 8, 2021, which is incorporated herein by reference in its entirety.

1. TECHNICAL FIELD

At least one of the present embodiments generally relates to a method and an apparatus for encoding or decoding a picture using a high precision 4×4 DST7 and/or DCT8 transform matrices.

2. BACKGROUND

To achieve high compression efficiency, video coding schemes usually employ predictions and transforms to leverage spatial and temporal redundancies in a video content. During an encoding, pictures of the video content are divided into blocks of samples (i.e. Pixels), these blocks being then partitioned into one or more sub-blocks, called original sub-blocks in the following. An intra or inter prediction is then applied to each sub-block to exploit intra or inter image correlations. Whatever the prediction method used (intra or inter), a predictor sub-block is determined for each original subblock. Then, a sub-block representing a difference between the original sub-block and the predictor sub-block, often denoted as a prediction error sub-block, a prediction residual sub-block or simply a residual block, is transformed, quantized and entropy coded to generate an encoded video stream. To reconstruct the video, the compressed data is decoded by inverse processes corresponding to the transform, quantization and entropic coding.

From the first video compression methods such as MPEG-1 (ISO/CEI-11172) or MPEG-2 (ISO/CEI 13818-2) to the latest such as VVC (H.266, ISO/IEC 23090-3, MPEG-I Part 3 (Versatile Video Coding)), the compression performances have highly improved but at the cost of a higher complexity. In order to keep a reasonable complexity, many encoding tools were design to reduce their complexity. This is the case for example of the transform that is now implemented in the form of integer matrixial operations. In VVC for instance, properties of integer coefficients of the transform matrices were exploited to design a fast implementation of the transform and inverse transform. However, these properties hold for a given (moderate) precision.

It is desirable to investigate if these properties continue to hold for higher precisions and, if not, to propose solutions allowing keeping fast implementations of the transform for higher precisions.

3. BRIEF SUMMARY

In a first aspect, one or more of the present embodiments provide a method for reconstructing a block of a picture comprising: applying an inverse transform to a block of transform coefficients using a first matrix of integer coefficients representative of the inverse transform, wherein the first matrix of integer coefficients is the inverse of a second matrix of integer coefficients representative of a transform inverted to obtain the inverse transform, the second matrix of integer coefficients being derived from a third matrix of integer coefficients, the absolute values of the integer coefficients of the third matrix taking their values in a set of four different values, the derivation comprising a modification of one value of the set to ensure that a sum of two values of the set equals a third value of the set.

In an embodiment, the transform is a DST7 and the third matrix is 4×4 matrix of the following form:

$$DST7 = \begin{pmatrix} a & b & c & d \\ c & c & 0 & -c \\ d & -a & -c & b \\ b & -d & c & -a \end{pmatrix}$$

where a, b, c and d are the four values and the modification comprise decreasing a of one unit, or decreasing b of one unit or increasing d of one unit.

In an embodiment, the transform is a DCT8 and the third matrix is 4×4 matrix of the following form:

$$DCT8 = \begin{pmatrix} d & c & b & a \\ c & 0 & -c & -c \\ b & -c & -a & d \\ a & -c & d & -b \end{pmatrix}$$

where a, b, c and d are the four values and the modification comprise decreasing a by one unit, or decreasing b of one unit or increasing d of one unit.

In a second aspect, one or more of the present embodiments provide a method for encoding a block of a picture comprising: applying a transform to a block of residual samples using a first matrix of integer coefficients representative of the transform, the first matrix of integer coefficients being derived from a second matrix of integer coefficients, the absolute values of the integer coefficients of the second matrix taking their values in a set of four different values, the derivation comprising a modification of one value of the set to ensure that a sum of two values of the set equals a third value of the set.

In an embodiment, the transform is a DST7 and the second matrix is 4×4 matrix of the following form:

$$DST7 = \begin{pmatrix} a & b & c & d \\ c & c & 0 & -c \\ d & -a & -c & b \\ b & -d & c & -a \end{pmatrix}$$

where a, b, c and d are the four values and the modification comprise decreasing a by one unit, or decreasing b of one unit or increasing d of one unit.

In an embodiment, the transform is a DCT8 and the second matrix is 4×4 matrix of the following form:

$$DCT8 = \begin{pmatrix} d & c & b & a \\ c & 0 & -c & -c \\ b & -c & -a & d \\ a & -c & d & -b \end{pmatrix}$$

where a, b, c and d are the four values and the modification comprise decreasing a by one unit, or decreasing b of one unit or increasing d of one unit.

In a third aspect, one or more of the present embodiments provide a device for reconstructing a block of a picture comprising an electronic circuitry adapted for: applying an inverse transform to a block of transform coefficients using a first matrix of integer coefficients representative of the inverse transform, wherein the first matrix of integer coefficients is the inverse of a second matrix of integer coefficients representative of a transform inverted to obtain the inverse transform, the second matrix of integer coefficients being derived from a third matrix of integer coefficients, the absolute values of the integer coefficients of the third matrix taking their values in a set of four different values, the derivation comprising a modification of one value of the set to ensure that a sum of two values of the set equals a third value of the set.

In an embodiment, the transform is a DST7 and the third matrix is 4×4 matrix of the following form:

$$DST7 = \begin{pmatrix} a & b & c & d \\ c & c & 0 & -c \\ d & -a & -c & b \\ b & -d & c & -a \end{pmatrix}$$

where a, b, c and d are the four values and the modification comprise decreasing a by one unit, or decreasing b of one unit or increasing d of one unit.

In an embodiment, the transform is a DCT8 and the third matrix is 4×4 matrix of the following form:

$$DCT8 = \begin{pmatrix} d & c & b & a \\ c & 0 & -c & -c \\ b & -c & -a & d \\ a & -c & d & -b \end{pmatrix}$$

where a, b, c and d are the four values and the modification comprise decreasing a by one unit, or decreasing b of one unit or increasing d of one unit.

In a fourth aspect, one or more of the present embodiments provide a device for encoding a block of a picture comprising an electronic circuitry adapted for: applying a transform to a block of residual samples using a first matrix of integer coefficients representative of the transform, the first matrix of integer coefficients being derived from a second matrix of integer coefficients, the absolute values of the integer coefficients of the second matrix taking their values in a set of four different values, the derivation comprising a modification of one value of the set to ensure that a sum of two values of the set equals a third value of the set.

In an embodiment, the transform is a DST7 and the second matrix is 4×4 matrix of the following form:

$$DST7 = \begin{pmatrix} a & b & c & d \\ c & c & 0 & -c \\ d & -a & -c & b \\ b & -d & c & -a \end{pmatrix}$$

where a, b, c and d are the four values and the modification comprise decreasing a by one unit, or decreasing b of one unit or increasing d of one unit.

In an embodiment, the transform is a DCT8 and the second matrix is 4×4 matrix of the following form:

$$DCT8 = \begin{pmatrix} d & c & b & a \\ c & 0 & -c & -c \\ b & -c & -a & d \\ a & -c & d & -b \end{pmatrix}$$

where a, b, c and d are the four values and the modification comprise decreasing a by one unit, or decreasing b of one unit or increasing d of one unit.

In a fifth aspect, one or more of the present embodiments provide a signal generated by the method of the second aspect or by the device of the fourth aspect.

In a sixth aspect, one or more of the present embodiments provide a computer program comprising program code instructions for implementing the method of the first or the second aspect.

In a seventh aspect, one or more of the present embodiments provide a non-transitory information storage medium storing program code instructions for implementing the method of the first or the second aspect.

4. BRIEF SUMMARY OF THE DRAWINGS

FIG. 1 describes an example of a context in which embodiments can be implemented;

5. DETAILED DESCRIPTION

Figure 1:
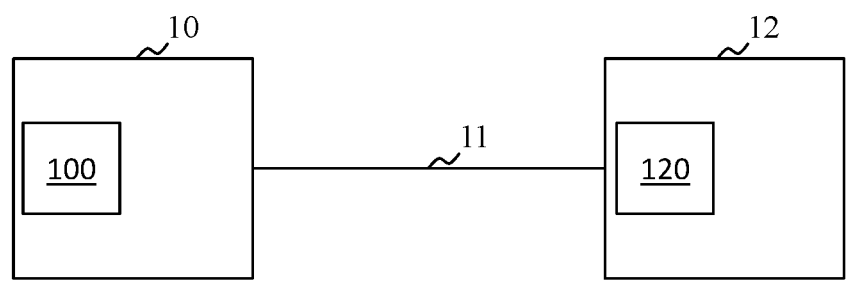

FIG. 1 describes an example of a context in which embodiments can be implemented.

In FIG. 1, a system 10 transmits a video stream to a system 12 using a communication channel 11.

The system 10 comprises for example an encoding module 100 compliant with the encoding method described below in relation to FIG. 3.

The system 12 comprises, for example, a decoding module 120. The decoding module 120 is compliant with the decoding method described below in relation to FIG. 4. The decoding module 120 decodes the video stream and forwards the decoded video stream to a display device.

The communication channel 11 is a wired (for example Internet or Ethernet) or a wireless (for example WiFi, 3G, 4G or 5G) network link.

The following examples of embodiments are described in the context of a video format similar to VVC. However, these embodiments are not limited to the video coding/decoding method corresponding to VVC. These embodiments are in particular adapted to any video format. Such formats comprise for example the standard EVC (Essential Video Coding/MPEG-5), AV1 and VP9.

Figure 2:
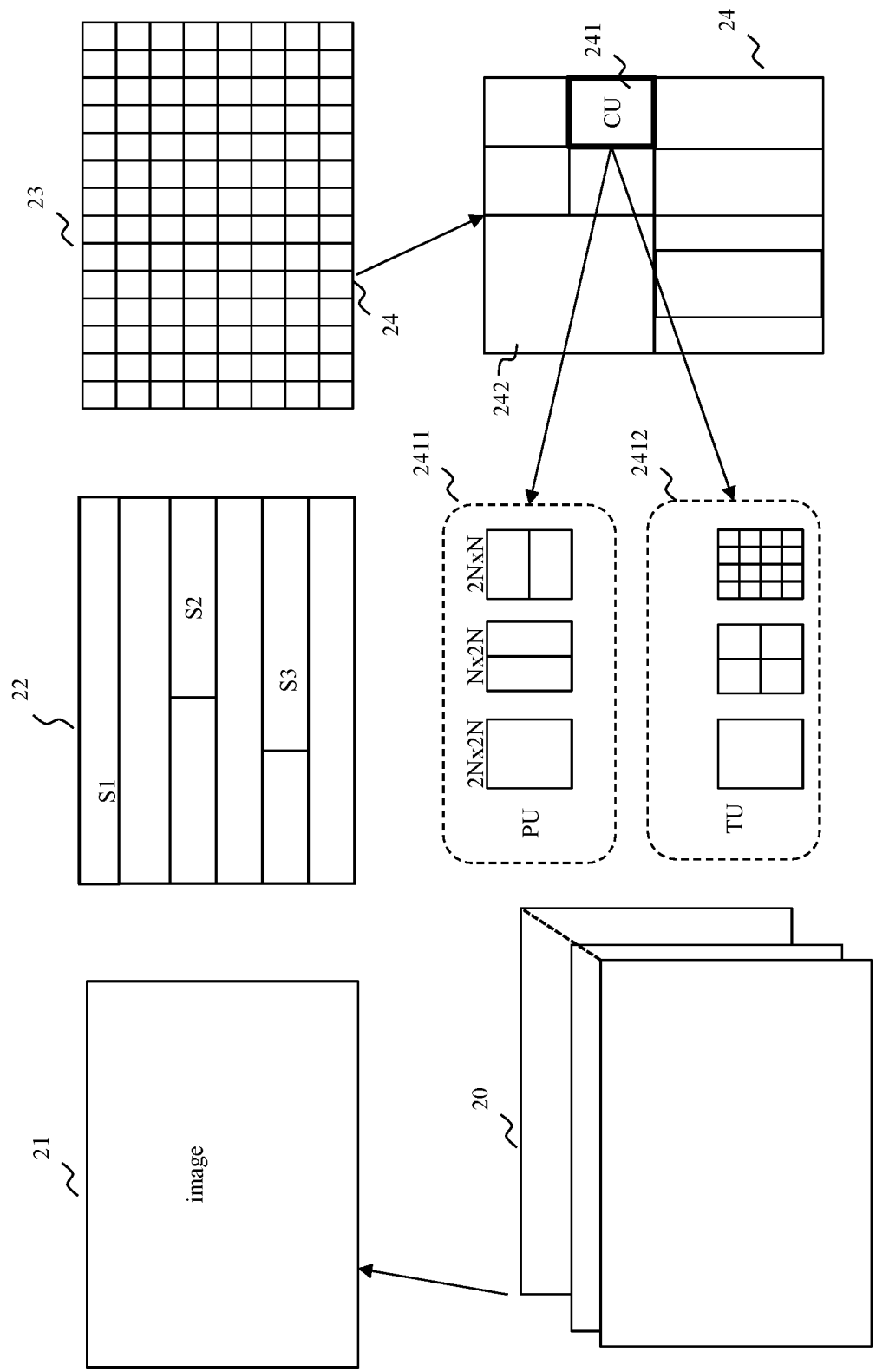
FIG. 2 illustrates schematically an example of partitioning undergone by a picture of pixels of an original video.
Figure 3:
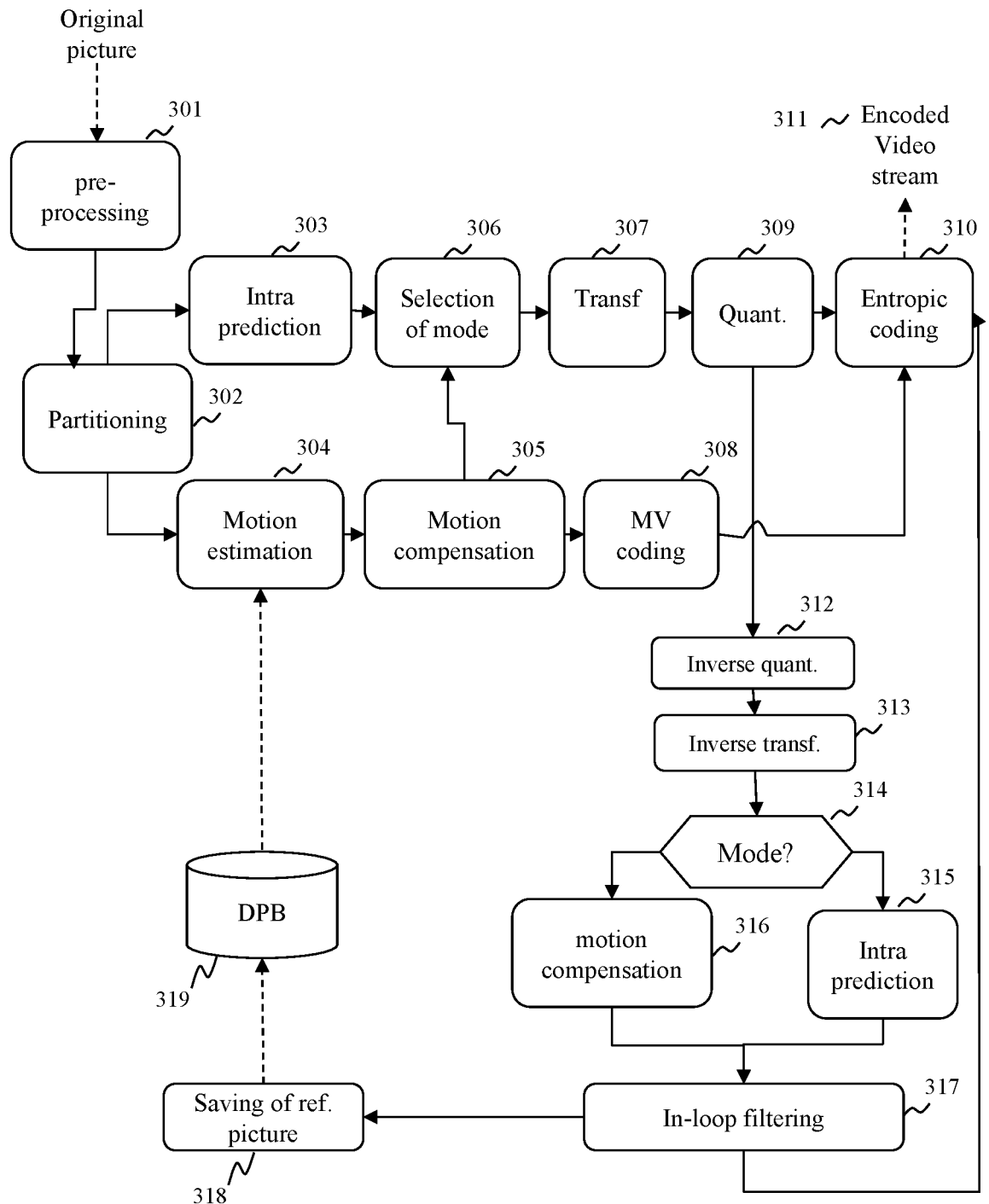
FIG. 3 depicts schematically a method for encoding a video stream.
Figure 4:
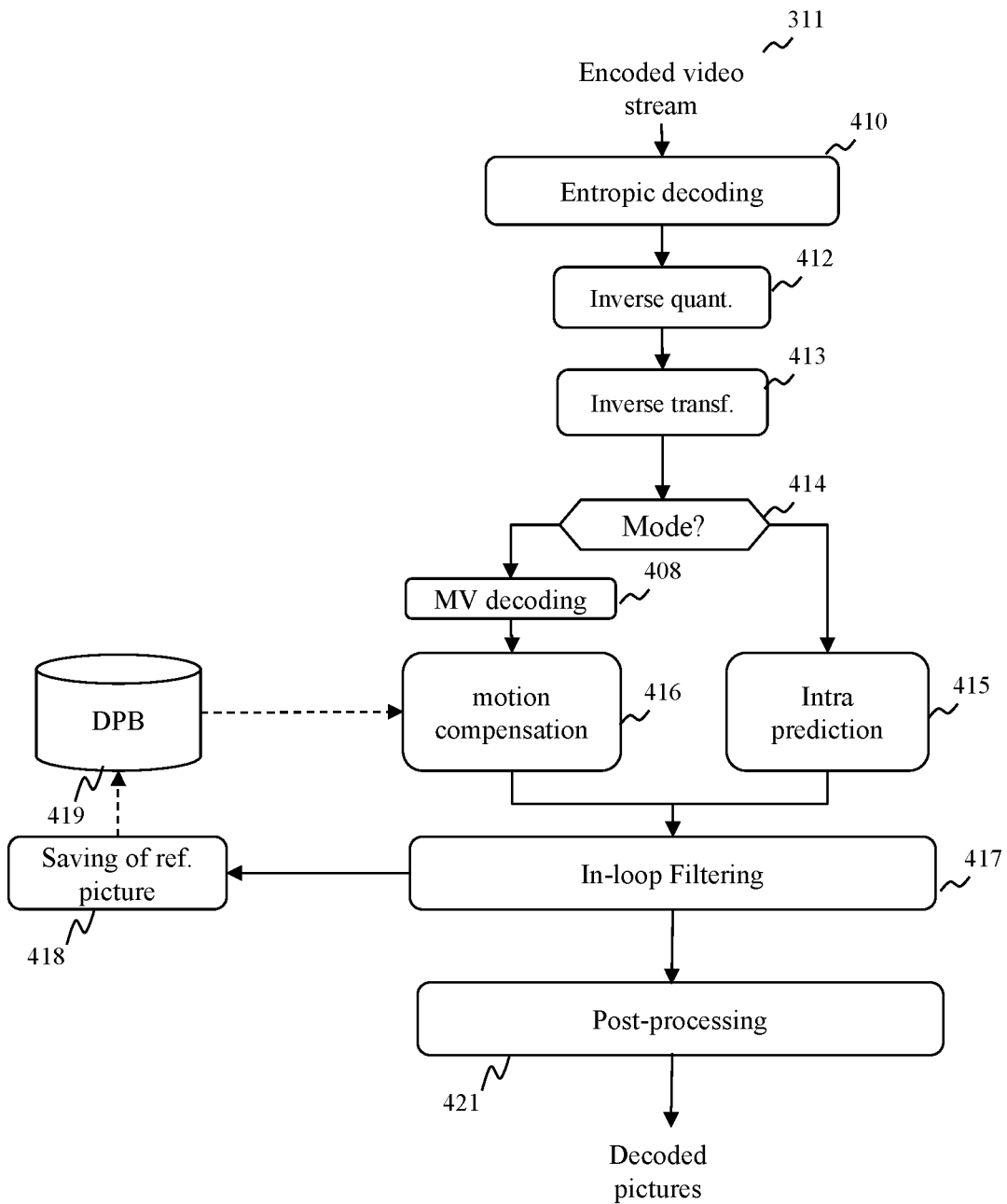
FIG. 4 depicts schematically a method for decoding an encoded video stream.

FIGS. 2, 3 and 4 introduce an example of video format.

FIG. 2 illustrates an example of partitioning undergone by a picture of pixels 21 of an original video 20. It is considered here that a pixel is composed of three components: a luminance component and two chrominance components. Other types of pixels are however possible comprising less or more components such as only a luminance component or an additional depth component.

A picture is divided into a plurality of coding entities. First, as represented by reference 23 in FIG. 2, a picture is divided in a grid of blocks called coding tree units (CTU). A CTU consists of an N×N block of luminance samples together with two corresponding blocks of chrominance samples. N is generally a power of two having a maximum value of "128" for example. Second, a picture is divided into one or more groups of CTU. For example, it can be divided into one or more tile rows and tile columns, a tile being a sequence of CTU covering a rectangular region of a picture. In some cases, a tile could be divided into one or more bricks, each of which consisting of at least one row of CTU within the tile. Above the concept of tiles and bricks, another encoding entity, called slice, exists, that can contain at least one tile of a picture or at least one brick of a tile.

In the example in FIG. 2, as represented by reference 22, the picture 21 is divided into three slices S1, S2 and S3 of the raster-scan slice mode, each comprising a plurality of tiles (not represented), each tile comprising only one brick.

As represented by reference 24 in FIG. 2, a CTU may be partitioned into the form of a hierarchical tree of one or more sub-blocks called coding units (CU). The CTU is the root (i.e. the parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned.

In the example of FIG. 2, the CTU 24 is first partitioned in "4" square CU using a quadtree type partitioning. The upper left CU is a leaf of the hierarchical tree since it is not further partitioned, i.e. it is not a parent node of any other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

During the coding of a picture, the partitioning is adaptive, each CTU being partitioned so as to optimize a compression efficiency of the CTU criterion.

In HEVC appeared the concept of prediction unit (PU) and transform unit (TU). Indeed, in HEVC, the coding entity that is used for prediction (i.e. a PU) and transform (i.e. a TU) can be a subdivision of a CU. For example, as represented in FIG. 2, a CU of size 2N×2N, can be divided in PU 2411 of size N×2N or of size 2N×N. In addition, said CU can be divided in "4" TU 2412 of size N×N or in "16" TU of size $$\left(\frac{N}{2}\right) \times \left(\frac{N}{2}\right).$$

One can note that in VVC, except in some particular cases, frontiers of the TU and PU are aligned on the frontiers of the CU. Consequently, a CU comprises generally one TU and one PU.

In the present application, the term "block" or "picture block" can be used to refer to any one of a CTU, a CU, a PU and a TU. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "subpicture", "slice" and "frame" may be used interchangeably. Usually, but not necessarily, the term "reconstructed" is used at the encoder side while "decoded" is used at the decoder side.

FIG. 3 depicts schematically a method for encoding a video stream executed by an encoding module. Variations of this method for encoding are contemplated, but the method for encoding of FIG. 3 is described below for purposes of clarity without describing all expected variations.

Before being encoded, a current original image of an original video sequence may go through a pre-processing. For example, in a step 301, a color transform is applied to the current original picture (e.g., conversion from RGB 4:4:4 to YCbCr 4:2:0), or a remapping is applied to the current original picture components in order to get a signal distribution more resilient to compression (for instance using a histogram equalization of one of the color components).

The encoding of the pre-processed pictures begins with a partitioning of the pre-processed picture during a step 302, as described in relation to FIG. 2. The pre-processed picture is thus partitioned into CTU, CU, PU, TU, etc. For each block, the encoding module determines a coding mode between an intra prediction and an inter prediction.

The intra prediction consists of predicting, in accordance with an intra prediction method, during a step 303, the pixels of a current block from a prediction block derived from pixels of reconstructed blocks situated in a causal vicinity of the current block to be coded. The result of the intra prediction is a prediction direction indicating which pixels of the blocks in the vicinity to use, and a residual block resulting from a calculation of a difference between the current block and the prediction block.

The inter prediction consists of predicting the pixels of a current block from a block of pixels, referred to as the reference block, of a picture preceding or following the current picture, this picture being referred to as the reference picture. During the coding of a current block in accordance with the inter prediction method, a block of the reference picture closest, in accordance with a similarity criterion, to the current block is determined by a motion estimation step 304. During step 304, a motion vector indicating the position of the reference block in the reference picture is determined. The motion vector determined by the motion estimation is used during a motion compensation step 305 during which a residual block is calculated in the form of a difference between the current block and the reference block. In first video compression standards, the mono-directional inter prediction mode described above was the only inter mode available.

During a selection step 306, the prediction mode optimising the compression performances, in accordance with a rate/distortion optimization criterion (i.e. RDO criterion), among the prediction modes tested (Intra prediction modes, Inter prediction modes), is selected by the encoding module.

When the prediction mode is selected, the residual block is transformed during a step 307. The transform is a fundamental process in video coding. Traditionally, DCT2 is used as a default transform as it well matches the properties of a residual signal. To improve the coding efficiency, additional transforms can be used. In some video encoding methods, a 4×4 DST7 transform is used for 4×4 intra coded blocks. Recently, DST7 and DCT8 were used as additional transforms, in a coding tool called multiple transform selection (MTS), for block sizes from 4×4 to 32×32.

Mathematically, a DST7 transform matrix of size 4×4 is defined by the following basis function:

$$\tau_i(j) = \sqrt{\frac{4}{2N+1}} \cdot \sin\left(\frac{\pi \cdot (2i+1) \cdot (j+1)}{2N+1}\right)$$

Where i and j are respectively integer vertical and horizontal indexes from "0" to "3" and N=4.

A DCT8 can be directly obtained from a DST7 by horizontally flipping the DST7 transform matrix and sign-inverting the odd-ordered rows.

As already mentioned, the transform matrices are represented by integer values. In some implementations, the integer values are obtained by shifting the transform matrices coefficients obtained with the basis function by "6" bits and scaling the value by the square root of the transform length. That is, the integer representation of 4×4 transform matrix of DST7 is:

$$INT_{\tau_i(j)} = \quad \text{(eq. 1)}$$

$$int\left(\sqrt{\frac{4}{2N+1}} \cdot \sin\left(\frac{\pi \cdot (2i+1) \cdot (j+1)}{2N+1}\right) \cdot 2^{Shift} \cdot \sqrt{N}\right)$$

Where int( ) is takes the integer part of a value (rounding operation), and Shift is a design bit-depth (equal to "6" in VVC).

This equation allows obtaining the following DST7 and DCT8 4×4 matrices:

$$DST7 = \begin{pmatrix} 29 & 55 & 74 & 84 \\ 74 & 74 & 0 & -74 \\ 84 & -29 & -74 & 55 \\ 55 & -84 & 74 & -29 \end{pmatrix}$$

$$DCT8 = \begin{pmatrix} 84 & 74 & 55 & 29 \\ 74 & 0 & -74 & -74 \\ 55 & -74 & -29 & 84 \\ 29 & -74 & 84 & -55 \end{pmatrix}$$

It can be noted that the absolute values of the coefficients of the 4×4 DST7 and DCT8 transform matrices takes their values in a set of four different values "a=29, b=55, c=74 and d=84". Therefore, we can write the matrices and the following form:

$$DST7 = \begin{pmatrix} a & b & c & d \\ c & c & 0 & -c \\ d & -a & -c & b \\ b & -d & c & -a \end{pmatrix}$$

$$DCT8 = \begin{pmatrix} d & c & b & a \\ c & 0 & -c & -c \\ b & -c & -a & d \\ a & -c & d & -b \end{pmatrix}$$

It can be noted that an horizontal flip of the DCT7 matrix allows obtaining the following matrix:

$$ST7\_h = \begin{pmatrix} d & c & b & a \\ -c & 0 & c & c \\ b & -c & -a & b \\ -a & c & -d & b \end{pmatrix}$$

Then by sign inversing the odd rows, the following matrix is obtained:

$$DST7\_h\_sign = \begin{pmatrix} d & c & b & a \\ c & 0 & -c & -c \\ b & -c & -a & b \\ a & -c & d & -b \end{pmatrix}$$

which corresponds exactly to the DCT8 matrix.

Interestingly, there exists some mathematical properties of these transform matrices that enables fast computation. Namely: a+b=d.

This can be exploited to reduce the number of multiplications. For an input signal In[i] to be transformed into an output signal Out[i], where i ranges from "0" to "3", the first coefficient of DST7 transform is computed as follows:

Out[0]=a*In[0]+b*In[1]+c*In[2]+d*In[3];

which comprises "4" multiplications.

This can be simplified by replacing d by a+b:

Out[0]=a*In[0]+b*In[1]+c*In[2]+(a+b)*In[3];

Out[0]=a*(In[0]+In[3])+b*(In[1]+In[3])+c*In[2];

which comprise "3" multiplications.

The second property is that the second row of DST7 matrix contains a single non-zero value, which is c. That is, the second coefficient can be computed as:

c*In[0]+c*In[1]+0*In[2]−c*In[3];

which can be simplified in:

c*(In[0]+In[1]+In[3]);

which require only one multiplication.

Finally, with these simplifications based on the properties of the matrix coefficients, the transform by the DST7 and DCT8 requires only "8" multiplications instead of "16".

In a step 309, the transformed residual block is quantized. Note that the encoding module can skip the transform and apply quantization directly to the non-transformed residual signal. When the current block is coded according to an intra prediction mode, a prediction direction and the transformed and quantized residual block are encoded by an entropic encoder during a step 310. When the current block is encoded according to an inter prediction, when appropriate, a motion vector of the block is predicted from a prediction vector selected from a set of motion vectors corresponding to reconstructed blocks situated in the vicinity of the block to be coded. The motion information is next encoded by the entropic encoder during step 310 in the form of a motion residual and an index for identifying the prediction vector. The transformed and quantized residual block is encoded by the entropic encoder during step 310. Note that the encoding module can bypass both transform and quantization, i.e., the entropic encoding is applied on the residual without the application of the transform or quantization processes. The result of the entropic encoding is inserted in an encoded video stream 311.

After the quantization step 309, the current block is reconstructed so that the pixels corresponding to that block can be used for future predictions. This reconstruction phase is also referred to as a prediction loop. An inverse quantization is therefore applied to the transformed and quantized residual block during a step 312 and an inverse transformation is applied during a step 313. In case of the 4×4 DST7 and DCT8 transforms, the inverse transform is equal to the transpose of the transform:

$$DST7^{-1}=DST7^T$$

$$DCT8^{-1}=DCT8^T$$

where $M^T$ is the transpose of a matrix M.

According to the prediction mode used for the block obtained during a step 314, the prediction block of the block is reconstructed. If the current block is encoded according to an inter prediction mode, the encoding module applies, when appropriate, during a step 316, a motion compensation using the motion vector of the current block in order to identify the reference block of the current block. If the current block is encoded according to an intra prediction mode, during a step 315, the prediction direction corresponding to the current block is used for reconstructing the reference block of the current block. The reference block and the reconstructed residual block are added in order to obtain the reconstructed current block.

Following the reconstruction, an in-loop filtering intended to reduce the encoding artefacts is applied, during a step 317, to the reconstructed block. This filtering is called in-loop filtering since this filtering occurs in the prediction loop to obtain at the decoder the same reference images as the encoder and thus avoid a drift between the encoding and the decoding processes. In-loop filtering tools comprises for example deblocking filtering, SAO (Sample Adaptive Offset), ALF (Adaptive Loop Filter).

When a block is reconstructed, it is inserted during a step 318 into a reconstructed picture stored in a memory 319 of reconstructed images corresponding generally called Decoded Picture Buffer (DPB). The reconstructed images thus stored can then serve as reference images for other images to be coded.

Metadata such as SEI (supplemental enhancement information) messages can be attached to the encoded video stream 311. A SEI (Supplemental Enhancement Information) message as defined for example in standards such as AVC, HEVC or VVC is a data container associated to a video stream and comprising metadata providing information relative to the video stream.

FIG. 4 depicts schematically a method for decoding the encoded video stream 311 encoded according to method described in relation to FIG. 3 executed by a decoding module. Variations of this method for decoding are contemplated, but the method for decoding of FIG. 4 is described below for purposes of clarity without describing all expected variations.

The decoding is done block by block. For a current block, it starts with an entropic decoding of the current block during a step 410. Entropic decoding allows to obtain the prediction mode of the block.

If the block has been encoded according to an inter prediction mode, the entropic decoding allows to obtain, when appropriate, a prediction vector index, a motion residual and a residual block. During a step 408, a motion vector is reconstructed for the current block using the prediction vector index and the motion residual.

If the block has been encoded according to an intra prediction mode, entropic decoding allows to obtain a prediction direction and a residual block. Steps 412, 413, 414, 415, 416 and 417 implemented by the decoding module are in all respects identical respectively to steps 312, 313, 314, 315, 316 and 317 implemented by the encoding module. Decoded blocks are saved in decoded pictures and the decoded pictures are stored in a DPB 419 in a step 418. When the decoding module decodes a given picture, the pictures stored in the DPB 419 are identical to the pictures stored in the DPB 319 by the encoding module during the encoding of said given image. The decoded picture can also be outputted by the decoding module for instance to be displayed.

The decoded image can further go through post-processing in step 421. The post-processing can comprise an inverse color transform (e.g. conversion from YCbCr 4:2:0 to RGB 4:4:4), an inverse mapping performing the inverse of the remapping process performed in the pre-processing of step 301, a post-filtering for improving the reconstructed pictures based for example on filter parameters provided in a SEI message and/or a resampling for example for adjusting the output images to display constraints.

Figure 5A:
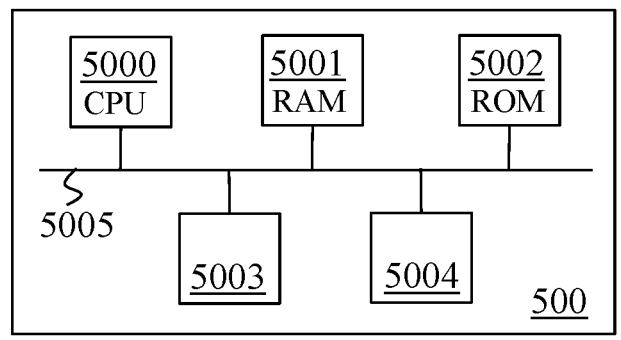
FIG. 5A illustrates schematically an example of hardware architecture of a processing module able to implement an encoding module or a decoding module in which various aspects and embodiments are implemented.

FIG. 5A illustrates schematically an example of hardware architecture of a processing module 500 able to implement the encoding module 100 or the decoding module 120 capable of implementing respectively the method for encoding of FIG. 3 and the method for decoding of FIG. 4 modified according to different aspects and embodiments described in the following. The processing module 500 comprises, connected by a communication bus 5005: a processor or CPU (central processing unit) 5000 encompassing one or more microprocessors, general purpose computers, special purpose computers, and processors based on a multi-core architecture, as non-limiting examples: a random access memory (RAM) 5001: a read only memory (ROM) 5002: a storage unit 5003, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device: at least one communication interface 5004 for exchanging data with other modules, devices or equipment. The communication interface 5004 can include, but is not limited to, a transceiver configured to transmit and to receive data over a communication channel. The communication interface 5004 can include, but is not limited to, a modem or network card.

If the processing module 500 implements the decoding module 120, the communication interface 5004 enables for instance the processing module 500 to receive encoded video streams and to provide a sequence of decoded pictures.

If the processing module 500 implements the encoding module 100, the communication interface 5004 enables for instance the processing module 500 to receive a sequence of original picture data to encode and to provide an encoded video stream.

The processor 5000 is capable of executing instructions loaded into the RAM 5001 from the ROM 5002, from an external memory (not shown), from a storage medium, or from a communication network. When the processing module 500 is powered up, the processor 5000 is capable of reading instructions from the RAM 5001 and executing them. These instructions form a computer program causing, for example, the implementation by the processor 5000 of a decoding method as described in relation with FIG. 4 or an encoding method as described in relation with FIG. 3, the decoding and encoding methods comprising various aspects and embodiments described below in this document.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 5B:
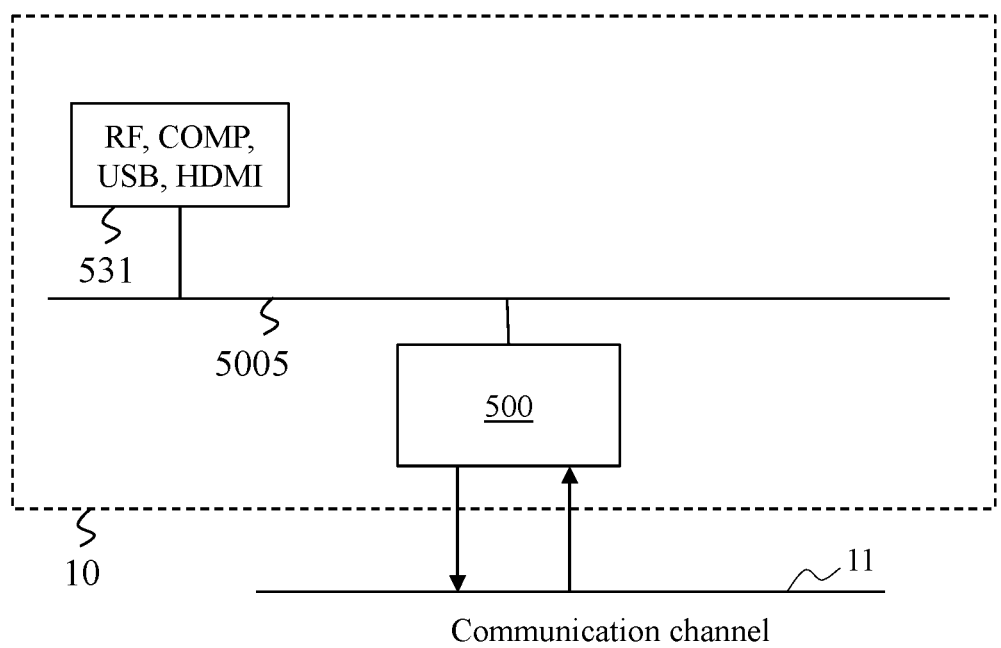
FIG. 5B illustrates a block diagram of an example of a first system in which various aspects and embodiments are implemented; and, FIG. 5C illustrates a block diagram of an example of a second system in which various aspects and embodiments are implemented.
Figure 5C:
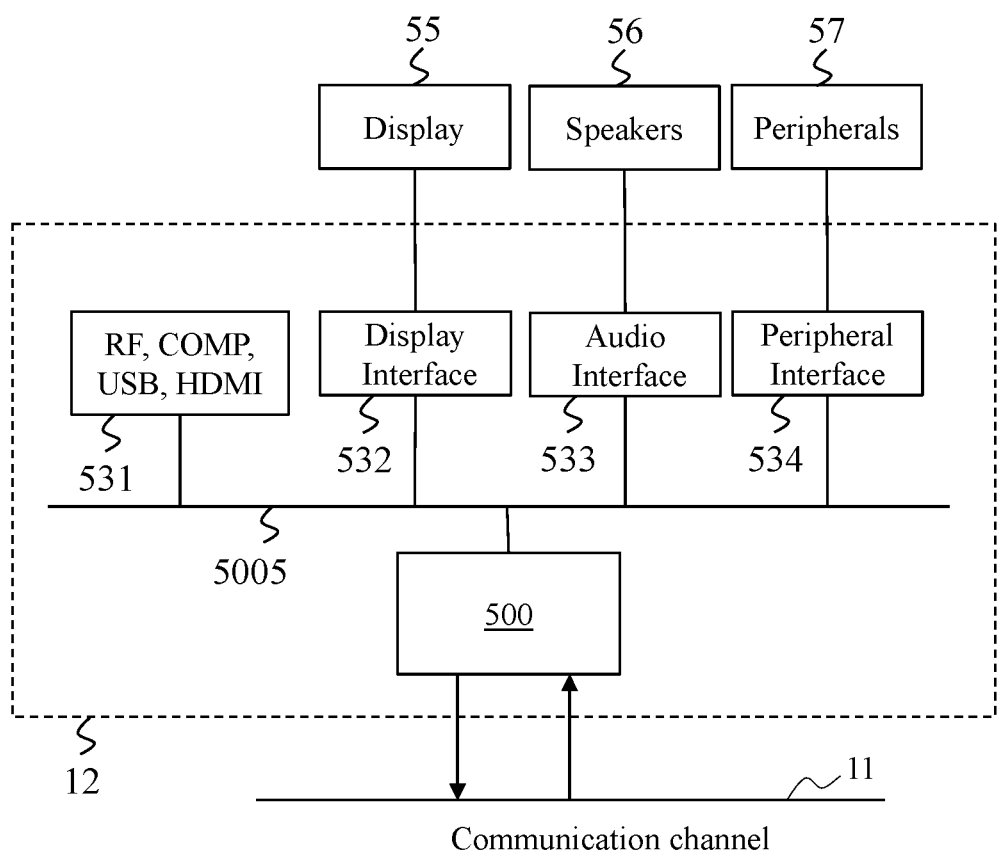

FIG. 5C illustrates a block diagram of an example of the system 12 in which various aspects and embodiments are implemented. The system 12 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, game console, and head mounted display. Elements of system 12, singly or in combination, can be embodied in a single integrated circuit (IC), multiple ICs, and/or discrete components. For example, in at least one embodiment, the system 12 comprises one processing module 500 that implements the decoding module 120. In various embodiments, the system 12 is communicatively coupled to one or more other systems, or other electronic devices, via, for example, a communications bus or through dedicated input and/or output ports. In various embodiments, the system 12 is configured to implement one or more of the aspects described in this document.

The input to the processing module 500 can be provided through various input modules as indicated in block 531. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 5C, include composite video.

In various embodiments, the input modules of block 531 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one embodiment, the RF module and its associated input processing element receives a RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 12 to other electronic devices across USB and/or HDMI connections. It is to be understood that various aspects of input processing, for example, Reed-Solomon error correction, can be implemented, for example, within a separate input processing IC or within the processing module 500 as necessary. Similarly, aspects of USB or HDMI interface processing can be implemented within separate interface ICs or within the processing module 500 as necessary. The demodulated, error corrected, and demultiplexed stream is provided to the processing module 500.

Various elements of system 12 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 12, the processing module 500 is interconnected to other elements of said system 12 by the bus 5005.

The communication interface 5004 of the processing module 500 allows the system 12 to communicate on the communication channel 11. As already mentioned above, the communication channel 11 can be implemented, for example, within a wired and/or a wireless medium.

Data is streamed, or otherwise provided, to the system 12, in various embodiments, using a wireless network such as a Wi-Fi network, for example IEEE 802.11 (IEEE refers to the Institute of Electrical and Electronics Engineers). The Wi-Fi signal of these embodiments is received over the communications channel 11 and the communications interface 5004 which are adapted for Wi-Fi communications. The communications channel 11 of these embodiments is typically connected to an access point or router that provides access to external networks including the Internet for allowing streaming applications and other over-the-top communications. Other embodiments provide streamed data to the system 12 using the RF connection of the input block 531. As indicated above, various embodiments provide data in a non-streaming manner. Additionally, various embodiments use wireless networks other than Wi-Fi, for example a cellular network or a Bluetooth network.

The system 12 can provide an output signal to various output devices, including a display system 55, speakers 56, and other peripheral devices 57. The display system 55 of various embodiments includes one or more of, for example, a touchscreen display, an organic light-emitting diode (OLED) display, a curved display, and/or a foldable display. The display 55 can be for a television, a tablet, a laptop, a cell phone (mobile phone), a head mounted display or other devices. The display system 55 can also be integrated with other components (for example, as in a smartphone), or separate (for example, an external monitor for a laptop). The other peripheral devices 57 include, in various examples of embodiments, one or more of a stand-alone digital video disc (or digital versatile disc) (DVR, for both terms), a disk player, a stereo system, and/or a lighting system. Various embodiments use one or more peripheral devices 57 that provide a function based on the output of the system 12. For example, a disk player performs the function of playing an output of the system 12.

In various embodiments, control signals are communicated between the system 12 and the display system 55, speakers 56, or other peripheral devices 57 using signaling such as AV.Link, Consumer Electronics Control (CEC), or other communications protocols that enable device-to-device control with or without user intervention. The output devices can be communicatively coupled to system 12 via dedicated connections through respective interfaces 532, 533, and 534. Alternatively, the output devices can be connected to system 12 using the communications channel 11 via the communications interface 5004 or a dedicated communication channel via the communication interface 5004. The display system 55 and speakers 56 can be integrated in a single unit with the other components of system 12 in an electronic device such as, for example, a television. In various embodiments, the display interface 532 includes a display driver, such as, for example, a timing controller (T Con) chip.

The display system 55 and speaker 56 can alternatively be separate from one or more of the other components. In various embodiments in which the display system 55 and speakers 56 are external components, the output signal can be provided via dedicated output connections, including, for example, HDMI ports, USB ports, or COMP outputs.

FIG. 5B illustrates a block diagram of an example of the system 10 in which various aspects and embodiments are implemented. System 10 is very similar to system 12. The system 10 can be embodied as a device including the various components described below and is configured to perform one or more of the aspects and embodiments described in this document. Examples of such devices include, but are not limited to, various electronic devices such as personal computers, laptop computers, smartphones, tablet computers, cameras and a server. Elements of system 10, singly or in combination, can be embodied in a single integrated circuit (IC), multiple ICs, and/or discrete components. For example, in at least one embodiment, the system 10 comprises one processing module 500 that implements the encoding module 100. In various embodiments, the system 10 is communicatively coupled to one or more other systems, or other electronic devices, via, for example, a communications bus or through dedicated input and/or output ports. In various embodiments, the system 10 is configured to implement one or more of the aspects described in this document.

The input to the processing module 500 can be provided through various input modules as indicated in block 531 already described in relation to FIG. 5C.

Various elements of system 10 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 10, the processing module 500 is interconnected to other elements of said system 10 by the bus 5005.

The communication interface 5004 of the processing module 500 allows the system 500 to communicate on the communication channel 11.

In the embodiment of FIG. 1, the system 10 comprises only the encoding module 100. In that case, picture data generated are generated for example by a camera connected to the system 100. These picture data are streamed, or otherwise provided, to the system 10, in various embodiments, using a wireless network such as a Wi-Fi network, for example IEEE 802.11 (IEEE refers to the Institute of Electrical and Electronics Engineers). The Wi-Fi signal of these embodiments is received over the communications channel 11 and the communications interface 5004 which are adapted for Wi-Fi communications. The communications channel 11 of these embodiments is typically connected to an access point or router that provides access to external networks including the Internet for allowing streaming applications and other over-the-top communications. Other embodiments provide streamed data to the apparatus 10 using the RF connection of the input block 531.

As indicated above, various embodiments provide data in a non-streaming manner. Additionally, various embodiments use wireless networks other than Wi-Fi, for example a cellular network or a Bluetooth network.

In an embodiment, the camera (or any picture generation module) is integrated in the system 10.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations described in this application, for example inverse transforming a block of transformed residual coefficients.

Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, and entropy coding. In various embodiments, such processes also, or alternatively, include processes performed by an encoder of various implementations described in this application, for example, for transforming a residual block using a fast implementation.

Whether the phrase "encoding process" is intended to refer specifically to a subset of operations or generally to the broader encoding process will be clear based on the context of the specific descriptions and is believed to be well understood by those skilled in the art.

Note that the syntax elements names as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), smartphones, tablets, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a use of some coding tools. In this way, in an embodiment the same parameters can be used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Document JVET-R0351 (http://phenix.it-sudparis.eu/jvet/) proposed a new transformation method. Compared to the method described above in relation to step 307, among the different modifications, the transform part is modified by changing the value of Shift to "14" instead of "6" to increase the precision of the transform. This changes the transform matrices of DST7 and DCT8. Specifically, the matrices become:

$$DST7 = \begin{pmatrix} 7425 & 14081 & 18893 & 21505 \\ 18893 & 18893 & 0 & -18893 \\ 21505 & -7425 & -18893 & 14081 \\ 14081 & -21505 & 18893 & -7425 \end{pmatrix}$$

$$DCT8 = \begin{pmatrix} 21505 & 18893 & 14081 & 7425 \\ 18893 & 0 & -18893 & -18893 \\ 14081 & -18893 & -7425 & 21505 \\ 7425 & -18893 & 21505 & -14081 \end{pmatrix}$$

with a=7425, b=14081, c=18893 and d=21505.

As can be seen, the property linking d to a and b (i.e. a+b=d) no more holds. This issue may prevent from using the fast implementation of the 4×4 DST7 and DCT8 transforms. There is therefore a need for finding a solution allowing using a fast implementation of the 4×4 DST7 and DCT8 transforms in higher precisions.

In a first embodiment, the transform matrices are modified for both the encoder and decoder side such that higher precisions is used for high bit-depth/high bit-rate coding. To keep "16" bit signed integer representations (2 bytes), the maximum possible shift value is "14". That is, the integer representation of 4×4 transform matrix of DST7 is:

$$INT_{T_i(j)} = \text{int}\left(\sqrt{\frac{4}{2N+1}} \cdot \sin\left(\frac{\pi \cdot (2i+1) \cdot (j+1)}{2N+1}\right) \cdot 2^{14} \cdot \sqrt{N}\right)$$

with N=4.

This equation results in the following values of matrix coefficients:

a=7472, b=14042, c=18919 and d=21513.

Clearly, the property of "a+b=d" does not hold, and thus the fast algorithm cannot be used.

In order to retrieve matrices compliant with the fast algorithm, in the first embodiment, the value of either a,b, or d are modified.

In a first variant of the first embodiment, the value a is decreased by one unit:

$a=a-1=7471$;

the DST7 matrix becomes:

$$DST7 = \begin{pmatrix} 7471 & 14042 & 18919 & 21513 \\ 18919 & 18919 & 0 & -18919 \\ 21513 & -7471 & -18919 & 14042 \\ 14042 & -21513 & 18919 & -7471 \end{pmatrix}$$

and the DCT8 becomes:

$$DCT8 = \begin{pmatrix} 21513 & 18919 & 14042 & 7471 \\ 18919 & 0 & -18919 & -18919 \\ 14042 & -18919 & -7471 & 21513 \\ 7471 & -18919 & 21513 & -14042 \end{pmatrix}$$

In a second variant of the first embodiment, the value b is decreased by one unit:

$b=b-1=14041$;

the DST7 matrix becomes:

$$DST7 = \begin{pmatrix} 7472 & 14041 & 18919 & 21513 \\ 18919 & 18919 & 0 & -18919 \\ 21513 & -7472 & -18919 & 14041 \\ 14041 & -21513 & 18919 & -7472 \end{pmatrix}$$

and the DCT8 becomes:

$$DCT8 = \begin{pmatrix} 21513 & 18919 & 14041 & 7472 \\ 18919 & 0 & -18919 & -18919 \\ 14041 & -18919 & -7472 & 21513 \\ 7472 & -18919 & 21513 & -14041 \end{pmatrix}$$

In a third variant of the first embodiment, the value d is increased by one unit:

$d=d+1=21513$;

the DST7 matrix becomes:

$$DST7 = \begin{pmatrix} 7472 & 14042 & 18919 & 21514 \\ 18919 & 18919 & 0 & -18919 \\ 21514 & -7472 & -18919 & 14042 \\ 14042 & -21514 & 18919 & -7472 \end{pmatrix}$$

and the DCT8 becomes:

$$DCT8 = \begin{pmatrix} 21514 & 18919 & 14042 & 7472 \\ 18919 & 0 & -18919 & -18919 \\ 14042 & -18919 & -7472 & 21514 \\ 7472 & -18919 & 21514 & -14042 \end{pmatrix}$$

As can be seen, in the first embodiment, the DST7 transform that is applied to a block of residual samples in step 307 takes the form of a first matrix of integer coefficients, the first matrix is derived from the following second matrix:

$$DST7 = \begin{pmatrix} 7472 & 14042 & 18919 & 21513 \\ 18919 & 18919 & 0 & -18919 \\ 21513 & -7472 & -18919 & 14042 \\ 14042 & -21513 & 18919 & -7472 \end{pmatrix}$$

The absolute value of the integer coefficients of the second matrix takes their values in a set of four different values a=7472, b=14042, c=18919 and d=21513. The derivation of the first matrix comprises a modification of one value of the set (i.e. a, b or d) to ensure that a sum of two values of the set equals a third value of the set (i.e. a+b=d).

The same applies to the DCT8 transform, the second matrix being:

$$DCT8 = \begin{pmatrix} 21513 & 18919 & 14042 & 7472 \\ 18919 & 0 & -18919 & -18919 \\ 14042 & -18919 & -7472 & 21513 \\ 7472 & -18919 & 21513 & -14042 \end{pmatrix}$$

In each variant of the first embodiment, the inverse transform matrix is computed as the transpose of the corresponding transform matrix.

In that case, the inverse DCT7 transform applied in step 313 and 413 on a block of transform coefficient uses a first matrix of integer coefficients. The first matrix is the inverse (i.e. the transpose) of a second matrix of integer coefficients representative of a transform inverted to obtain the inverse transform. The second matrix of integer coefficients is derived from a third matrix of integer coefficients which is in that case:

$$DST7 = \begin{pmatrix} 7472 & 14042 & 18919 & 21513 \\ 18919 & 18919 & 0 & -18919 \\ 21513 & -7472 & -18919 & 14042 \\ 14042 & -21513 & 18919 & -7472 \end{pmatrix}$$

The absolute values of the integer coefficients of the third matrix take their values in the set of four different values a=7472, b=14042, c=18919 and d=21513. The derivation comprises a modification of one value (a, b or d) of the set to ensure that a sum of two values of the set equals a third value of the set (i.e. a+b=d).

The same applies to the inverse DCT8 transform, the third matrix being:

$$DCT8 = \begin{pmatrix} 21513 & 18919 & 14042 & 7472 \\ 18919 & 0 & -18919 & -18919 \\ 14042 & -18919 & -7472 & 21513 \\ 7472 & -18919 & 21513 & -14042 \end{pmatrix}$$

In a second embodiment, only the transform matrices on the encoder side are improved with higher precision, the transform matrix on the decoder side (in fact the inverse transform matrices) are unchanged compared to the transform matrices (the inverse transform matrices) described in steps 307 and 313. Instead of directly computing the DST7 matrix using equation (eq. 1), the inverse of the inverse matrix as specified in step 313 is used in order to have the highest orthogonality between the forward and backward transforms. This leads to the following four values of the matrices coefficients:

a=7425, b=14081, c=18893, d=21505;

Again the property of "a+b=d" does not hold, and thus the fast algorithm cannot be used.

In order to retrieve matrices compliant with the fast algorithm, in the second embodiment, the value of either a, b, or d are modified.

In a first variant of the second embodiment, the value a is decreased by one unit:

a=a−1=7424;

the DST7 matrix becomes:

$$DST7 = \begin{pmatrix} 7424 & 14081 & 18893 & 21505 \\ 18893 & 18893 & 0 & -18893 \\ 21505 & -7424 & -18893 & 14081 \\ 14081 & -21505 & 18893 & -7424 \end{pmatrix}$$

and the DCT8 becomes:

$$DCT8 = \begin{pmatrix} 21505 & 18893 & 14081 & 7424 \\ 18893 & 0 & -18893 & -18893 \\ 14081 & -18893 & -7424 & 21505 \\ 7424 & -18893 & 21505 & -14081 \end{pmatrix}$$

In a second variant of the second embodiment, the value b is decreased by one unit:

b=b−1=14080;

the DST7 matrix becomes:

$$DST7 = \begin{pmatrix} 7425 & 14080 & 18893 & 21505 \\ 18893 & 18893 & 0 & -18893 \\ 21505 & -7425 & -18893 & 14080 \\ 14080 & -21505 & 18893 & -7425 \end{pmatrix}$$

and the DCT8 becomes:

$$DCT8 = \begin{pmatrix} 21505 & 18893 & 14080 & 7425 \\ 18893 & 0 & -18893 & -18893 \\ 14080 & -18893 & -7425 & 21505 \\ 7425 & -18893 & 21505 & -14080 \end{pmatrix}$$

In a third variant of the second embodiment, the value d is increased by one unit:

d=d+1=21506;

the DST7 matrix becomes:

$$DST7 = \begin{pmatrix} 7425 & 14081 & 18893 & 21506 \\ 18893 & 18893 & 0 & -18893 \\ 21506 & -7425 & -18893 & 14081 \\ 14081 & -21505 & 18893 & -7425 \end{pmatrix}$$

and the DCT8 becomes:

$$DCT8 = \begin{pmatrix} 21506 & 18893 & 14081 & 7425 \\ 18893 & 0 & -18893 & -18893 \\ 14081 & -18893 & -7425 & 21506 \\ 7425 & -18893 & 21506 & -14081 \end{pmatrix}$$

As can be seen, in the second embodiment, the DST7 transform that is applied to a block of residual samples in step 307 takes the form of a first matrix of integer coefficients, the first matrix is derived from the following second matrix:

$$DST7 = \begin{pmatrix} 7425 & 14081 & 18893 & 21505 \\ 18893 & 18893 & 0 & -18893 \\ 21505 & -7425 & -18893 & 14081 \\ 14081 & -21505 & 18893 & -7425 \end{pmatrix}$$

The absolute values of the integer coefficients of the second matrix take their values in a set of four different values a=7425, b=14081, c=18893, d=21505. The derivation of the first matrix comprises a modification of one value of the set (i.e. a, b or d) to ensure that a sum of two values of the set equals a third value of the set (i.e. a+b=d).

The same applies to the DCT8 transform, the second matrix being:

$$DCT8 = \begin{pmatrix} 21505 & 18893 & 14081 & 7425 \\ 18893 & 0 & -18893 & -18893 \\ 14081 & -18893 & -7425 & 21505 \\ 7425 & -18893 & 21505 & -14081 \end{pmatrix}$$

We described above a number of embodiments. Features of these embodiments can be provided alone or in any combination. Further, embodiments can include one or more of the following features, devices, or aspects, alone or in any combination, across various claim categories and types:

A bitstream or signal generated using the described transforms, or variations thereof.

Creating and/or transmitting and/or receiving and/or decoding a bitstream or signal based on the described transforms, or variations thereof.

A TV, set-top box, cell phone, tablet, or other electronic device that performs at least one of the embodiments described.

A TV, set-top box, cell phone, tablet, or other electronic device that performs at least one of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded video stream, and performs at least one of the embodiments described.

A TV, set-top box, cell phone, tablet, or other electronic device that receives (e.g. using an antenna) a signal over the air that includes an encoded video stream, and performs at least one of the embodiments described.

The invention claimed is:

1. A method comprising:
applying an inverse transform to a block of transform coefficients using a first matrix of integer coefficients representative of the inverse transform, wherein the first matrix of integer coefficients is based on an inverse of a second matrix of integer coefficients representative of a transform inverted to obtain the inverse transform, the second matrix of integer coefficients being derived from a third matrix of integer coefficients, absolute values of the integer coefficients of the third matrix taking their values in a set of at least three values, the derivation comprising a modification of one value of the set such that a sum of two values of the set equals a third value of the set, and the sum of the two values being different from the third value before the modification.

2. The method according to claim 1 wherein the transform is a DST7 and the third matrix is a 4×4 matrix of the following form:

$$DST7 = \begin{pmatrix} a & b & c & d \\ c & c & 0 & -c \\ d & -a & -c & b \\ b & -d & c & -a \end{pmatrix}$$

where a, b, c and d are four values of the set of at least three values and the modification comprises decreasing a of one unit or decreasing b of one unit or increasing d of one unit.

3. The method according to claim 1 wherein the transform is a DCT8 and the third matrix is a 4×4 matrix of the following form:

$$DCT8 = \begin{pmatrix} d & c & b & a \\ c & 0 & -c & -c \\ b & -c & -a & d \\ a & -c & d & -b \end{pmatrix}$$

where a, b, c and d are four values of the set of at least three values and the modification comprises decreasing a of one unit or decreasing b of one unit or increasing d of one unit.

4. A method comprising:
applying a transform to a block of residual samples using a first matrix of integer coefficients representative of the transform, the first matrix of integer coefficients being derived from a second matrix of integer coefficients, absolute values of the integer coefficients of the second matrix taking their values in a set of at least three values, the derivation comprising a modification of one value of the set such that a sum of two values of the set equals a third value of the set, and the sum of the two values being different from the third value before the modification.

5. The method according to claim 4 wherein the transform is a DST7 and the second matrix is a 4×4 matrix of the following form:

$$DST7 = \begin{pmatrix} a & b & c & d \\ c & c & 0 & -c \\ d & -a & -c & b \\ b & -d & c & -a \end{pmatrix}$$

where a, b, c and d are four values of the set of at least three values and the modification comprises decreasing a of one unit or decreasing b of one unit or increasing d of one unit.

6. The method according to claim 4 wherein the transform is a DCT8 and the second matrix is a 4×4 matrix of the following form:

$$DCT8 = \begin{pmatrix} d & c & b & a \\ c & 0 & -c & -c \\ b & -c & -a & d \\ a & -c & d & -b \end{pmatrix}$$

where a, b, c and d are four values of the set of at least three values and the modification comprise decreasing a of one unit or decreasing b of one unit or increasing d of one unit.

7. A device for reconstructing a block of a picture comprising an electronic circuitry adapted for:
applying an inverse transform to a block of transform coefficients using a first matrix of integer coefficients representative of the inverse transform, wherein the first matrix of integer coefficients is an inverse of a second matrix of integer coefficients representative of a transform inverted to obtain the inverse transform, the second matrix of integer coefficients being derived from a third matrix of integer coefficients, absolute values of the integer coefficients of the third matrix taking their values in a set of at least three values, the derivation comprising a modification of one value of the set such that a sum of two values of the set equals a third value of the set, and the sum of the two values being different from the third value before the modification.

8. The device according to claim 7 wherein the transform is a DST7 and the third matrix is a 4×4 matrix of the following form:

$$DST7 = \begin{pmatrix} a & b & c & d \\ c & c & 0 & -c \\ d & -a & -c & b \\ b & -d & c & -a \end{pmatrix}$$

where a, b, c and d are four values of the set of at least three values and the modification comprises decreasing a of one unit or decreasing b of one unit or increasing d of one unit.

9. The device according to claim 7 wherein the transform is a DCT8 and the third matrix is a 4×4 matrix of the following form:

$$DCT8 = \begin{pmatrix} d & c & b & a \\ c & 0 & -c & -c \\ b & -c & -a & d \\ a & -c & d & -b \end{pmatrix}$$

where a, b, c and d are four values of the set of at least three values and the modification comprises decreasing a of one unit or decreasing b of one unit or increasing d of one unit.

10. A device for encoding a block of a picture comprising an electronic circuitry adapted for:
applying a transform to a block of residual samples using a first matrix of integer coefficients representative of the transform, the first matrix of integer coefficients being derived from a second matrix of integer coefficients, absolute values of the integer coefficients of the second matrix taking their values in a set of at least three values, the derivation comprising a modification of one value of the set such that a sum of two values of the set equals a third value of the set, and the sum of the two values being different from the third value before the modification.

11. The device according to claim 10 wherein the transform is a DST7 and the second matrix is a 4×4 matrix of the following form:

$$DST7 = \begin{pmatrix} a & b & c & d \\ c & c & 0 & -c \\ d & -a & -c & b \\ b & -d & c & -a \end{pmatrix}$$

where a, b, c and d are three values of the set of at least three values and the modification comprises decreasing a of one unit or decreasing b of one unit or increasing d of one unit.

12. The device according to claim 10 wherein the transform is a DCT8 and the second matrix is a 4×4 matrix of the following form:

$$DCT8 = \begin{pmatrix} d & c & b & a \\ c & 0 & -c & -c \\ b & -c & -a & d \\ a & -c & d & -b \end{pmatrix}$$

where a, b, c and d are four values of the set of at least three values and the modification comprises decreasing a of one unit or decreasing b of one unit or increasing d of one unit.

13. Non-transitory information storage medium storing program code instructions for implementing a method according to claim 1.

14. Non-transitory information storage medium storing program code instructions for implementing a method according to claim 4.

* * * * *